July 14, 1970   J. R. HARDIN, JR   3,520,120
BATTERY OPERATED EDGER-TRIMMER AND POWER SCYTHE
Filed Jan. 22, 1968   2 Sheets-Sheet 1
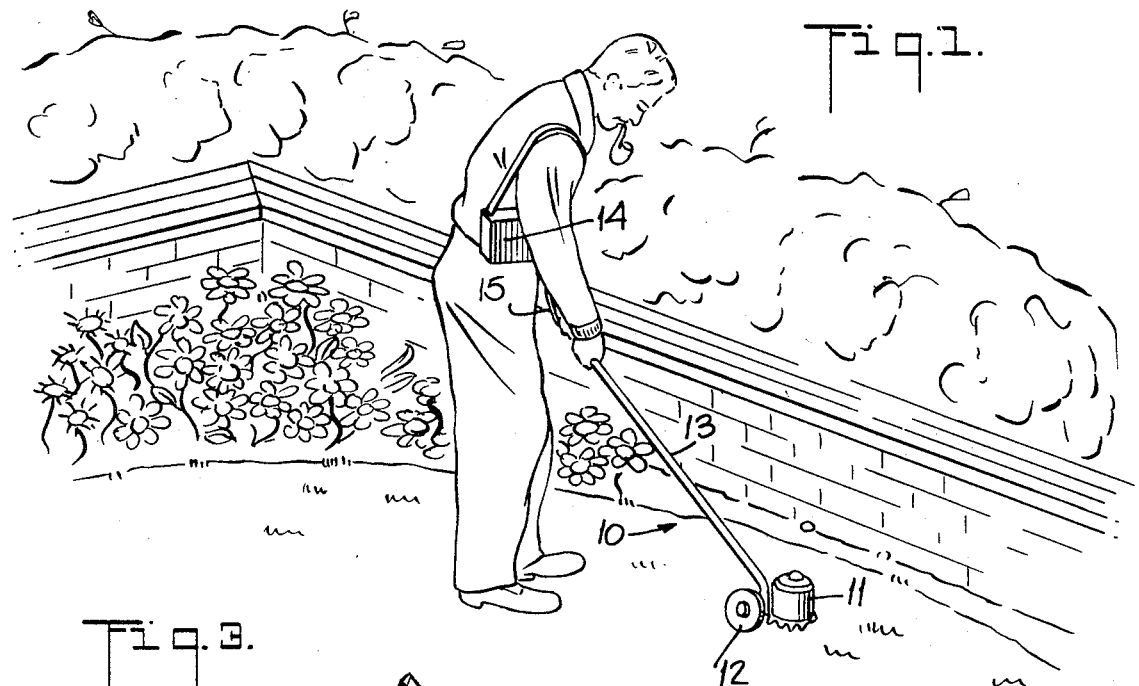
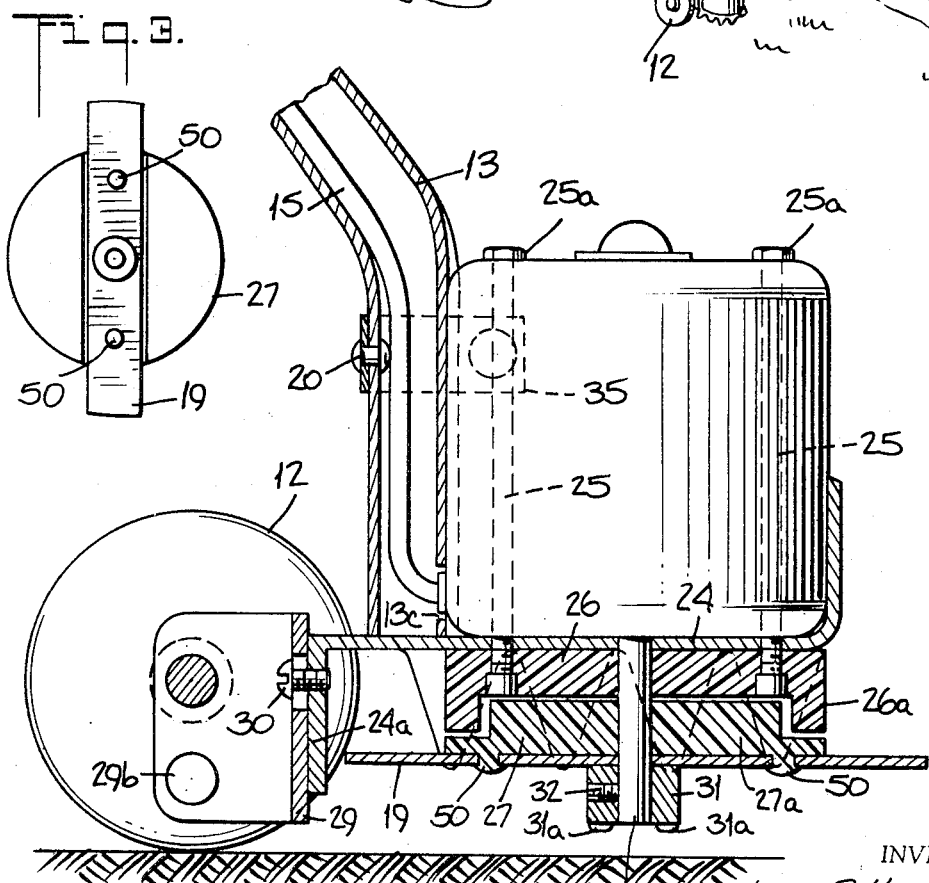
INVENTOR.
JOHN R. HARDIN, JR.

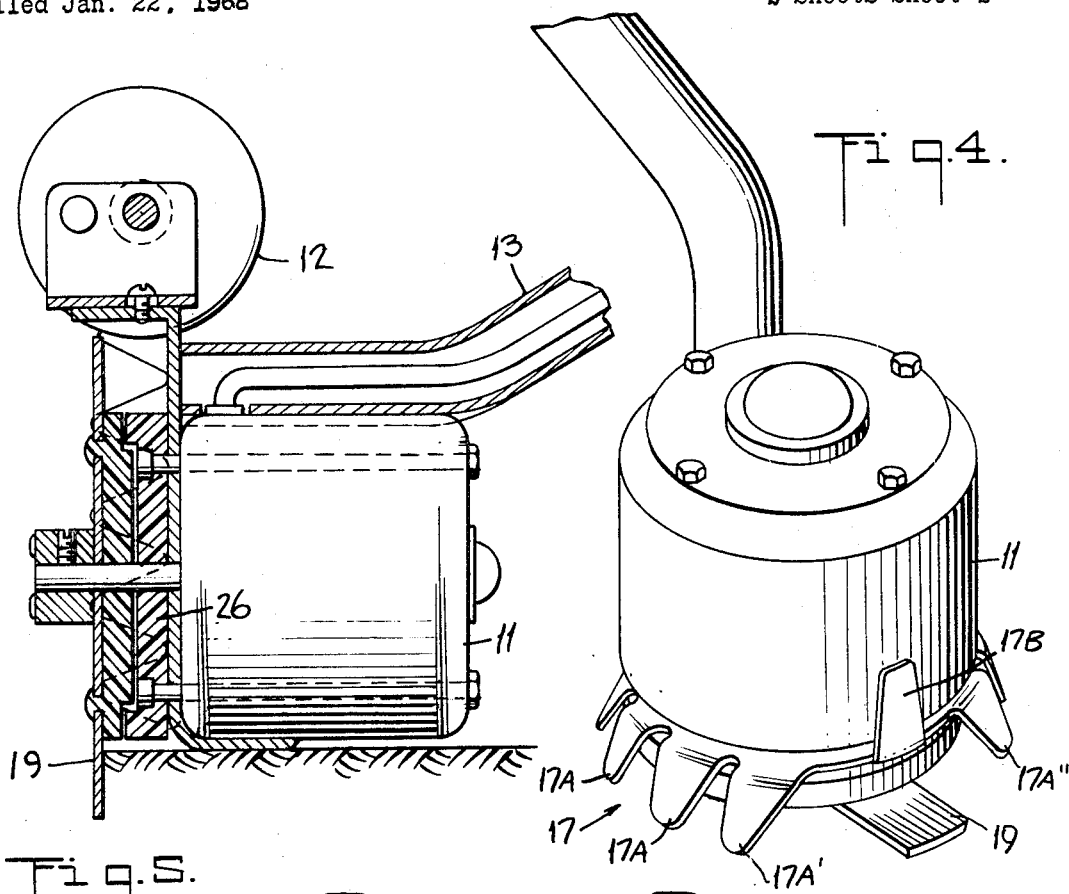
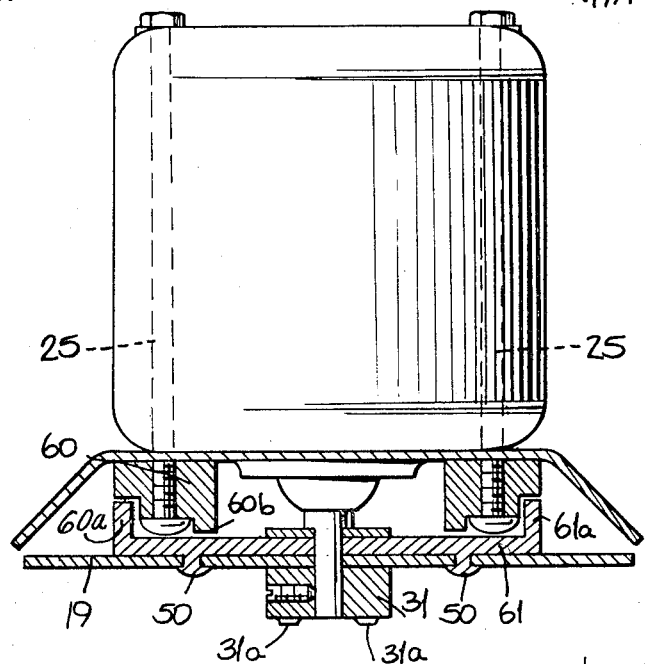

3,520,120
BATTERY OPERATED EDGER-TRIMMER AND
POWER SCYTHE
John R. Hardin, Jr., R.D. 1, Claremont Road,
Bernardsville, N.J. 07924
Filed Jan. 22, 1968, Ser. No. 699,543
Int. Cl. A01d 35/26
U.S. Cl. 56—25.4                              7 Claims

ABSTRACT OF THE DISCLOSURE

An edger trimmer power scythe for cutting growth including a deck having first and second sides and a motor located on a first side of the deck and rigidly secured to the deck. The motor has a shaft that projects through the deck with a cutter blade coupled to the shaft. A clog guard is secured to the second side of the deck and along with a rotor which is rotatable with the cutter blade prevents growth that is being cut from wrapping around the motor's shaft.

---

This invention relates to a cutting device and in particular to a battery powered edger-trimmer and power scythe that can effectively cut grass and other growth, and edge along flower beds, walks, drives and the like.

There are many makes, models and types of devices now on the market which perform the foregoing functions with varying degrees of effectiveness, ease and convenience.

Gasoline engine powered edger-trimmers and power scythes are normally amply powerful to perform the designated task quite effectively, namely the actual cutting and edging operation, but they have several disadvantages. They are, in the first place, heavy and unwieldy to handle with resultant operator fatigue. Secondly, they are generally designed to be wheeled on the ground and not lifted on swung about, although gasoline engine powered scythes are on the market which are carried by the operator by means of a shoulder harness. thirdly, being large and heavy trimming around the base of odd shaped objects such as stone walls is not easily accomplished. It is recognized that they are noisy and last, but by no means least, gasoline engine powered edger-trimmers and power scythes are expensive.

Perhaps the more popular edger-trimmers and power scythes are the electrically powered devices operating off extension cords which are plugged into 115 volt AC house current sockets. These electrically powered trimmers are generally less expensive than gasoline powered devices and they are certainly lighter in weight, easier to handle and maneuver and far less noisy. The problem with these electrical trimmers centers around the extension cord required to operate them. In the first place the operator is limited to the length of the cord. Additional lengths of extension cord extend the operating range but the cords used are generally, if not always, three conductor cords which are expensive. Secondly, even with the use of a grounded cord, the operator is cautioned not to use his electrical trimmer when the grass is wet as there is a possibility of electric shock. Thirdly, the long extension is unwieldy and easily cut by the operator if care at all times is not exercised. Finally, the pickup and storage of the extension requires time and inconvenience for it is easily tangled.

This points to the desirability of eliminating the extension cord through the use of a battery operated edger-trimmer or power scythe. Battery operated edger-trimmers have been designed and a few have been marketed but, as yet, these devices have many drawbacks. The primary drawback being that very often during the cutting of grass, weeds or other vegetation the growth being cut would wrap itself around the motor shaft causing the cutter blade to stop rotating. This necessitated at least the removal of the growth which if occurring often was a serious bother to the operator of an edger-trimmer. Edger-trimmers or rotary lawn mowers powered by the lead acid type automobile battery are very heavy and cumbersome. At the other extreme are little clippers operated by ordinary flashlight batteries having very limited battery life and insufficient motor power to cut effectively, much less edge at all. Sophisticated sources of battery power such as the more recently developed nickel-cadmium batteries do have the advantages of fairly light weight for power output and rechargeability. However, such batteries are extremely expensive when compared to the equivalent power output of lead acid, carbon zinc, alkaline or even mercury cells.

Thus, the real solution is in the designing of a more efficient edger-trimmer or power scythe which uses a reasonably sized, economical battery which will operate an effective edger trimmer for an adequate period of time before recharging of the battery is required. It is important that the power source which is used is of a rechargeable design.

There is finally an inherent danger in most types of rotary grass cutting devices wherein the cutter blade strikes stones and other objects hurling them substantial distances at a high velocity with resultant injury to humans or property in the immediate vicinity.

It is thus obvious that a battery powered edger-trimmer power scythe which can overcome the foregoing problems without loss of the good features of the prior art, and which is relatively inexpensive, will find widespread use.

It is therefore an object of the present invention to provide an improved battery powered edger-trimmer power scythe which will trim and edge effectively without requiring a motor drawing amounts of power so large as to make the use of a reasonably sized battery impractical.

As such it is an object of this invention to eliminate, for all intents and purposes, the load placed upon the motor resulting from grass, weeds or other vegetation wrapping itself around the shaft of the motor thus slowing or stopping the motor altogether.

It is a further object of this invention to design the rotating parts of the edger-trimmer of the lightest practical material so that the starting torque and resultant current draw of the motor will be kept at a minimum.

A further object of the present invention is to provide a battery powered edger-trimmer that should the cutter blade strike small objects such as stones it will not hurl them great distances at high velocity.

It is a further object of the present invention that the edger-trimmer be exceptionally light in weight so it is easily used, without fatigue, by men and women alike.

Other objects, features and aspects of the present invention will be apparent from the following specification and drawings in which:

FIG. 1 illustrates how the present invention may be utilized as a trimmer;

FIG. 2 is an enlarged view of the motor and cutting arrangement of the present invention;

FIG. 3 shows how the cutter blade of the present invention is attached to the rotor;

FIG. 4 is an enlarged view of the motor and cutting arrangement of the present invention;

FIG. 5 illustrates how the present invention may be used as a trimmer; and

FIG. 6 illustrates a modified form of the motor and cutter arrangement of the present invention.

Referring to the drawings, and more particularly to FIG. 1, a battery powered edger-trimmer and power scythe 10, hereinafter referred to as an edger-trimmer, is shown having a handle 13 with a high speed electric motor 11 on an end of the handle which directly rotates a cutter blade 19. Motor 11 can be any of the conventional high speed, low horsepower electrical motors available on the market. Siren motors are particularly adapted for this application having a speed of approximately 11,000 r.p.m. and a fractional horsepower rating. Wires 15 lead from motor 11, as will be later described, to a battery 14. A switch which is located on the handle and not seen in the figures, as it is covered by the operator's hands, controls the electrical connection between battery 14 and electrical motor 11.

While a large number of batteries of the conventional kind may be used, it is believed that the best results will be obtained if a wet cell is used. One type of wet cell that is believed to be particularly suited for the current application is a motorcycle type lead acid battery about 5 pounds in weight made by Yuasa of Japan and identified as MBN 3-12. As can be seen in FIG. 1 the battery, whatever type is used, should be small enough so it can be easily and comfortably supported on the operator's shoulder. The battery is inside a plastic case so accidental spillage of electrolite from inside the battery is contained in the case and not spilled onto the operator. Wheels 12 are attached to the edger-trimmer so it may conveniently be pushed along the ground.

As can be seen in FIG. 4, a guard 17 having teeth 17A surrounds cutter blade 19 in its path of revolution except for the gap between teeth 17A' and 17A" in front of the grass cutter. The tooth 17B that would normally fill the gap between teeth 17A' and 17A" is bent upwardly to allow the edger-trimmer to be used as an edger riding along tooth 17B with cutter blade 19 kerfing into the ground as illustrated in FIG. 5. Guard 17 when the edger-trimmer is used as a trimmer serves to keep large twigs, rocks and other objects from hitting the cutter blade and thus to a certain extent protects against undesired objects meeting with the rotating cutter blade and being projected thereby. As can be seen in FIG. 2, motor 11 is attached by a strap 35 and fastener 20 to handle 13. A hole 13c is in the bottom of handle 13 and receives wires 15 from motor 11 which comes out the top of the handle to be connected to battery 14.

An L-shaped deck 24 is directly below motor 11 and has a hole in it for motor shaft 23 to rotatably project. The deck constitutes guard 17 and forms teeth 17A which are V-shaped extensions bent down from the deck at an angle of approximately 45° thereto. Fastening means 30 attaches wheel plate 29 to the short side 24a of deck 24 the latter joined to wheels 12, of which only one can be seen in the figures, with the wheels being rotatably attached to wheel plate 29. The height of the cutter above the ground can be raised by attaching the wheels to wheel plate 29 at hole 29b. A circular stationary clog guard 26, preferably made of high strength plastic, is attached to deck 24 by motor studs 25 which extend up to the top of the motor and are fastened to nuts 25a. The motor studs 25 also serve to hold deck 24 directly beneath motor 11. Clog guard 26 surrounds shaft 23 at a slight gap so as to allow the shaft to freely rotate and has a circular flange 26a extending therefrom. A rotor 27 is directly beneath clog guard 26 and is generally disc-shaped with the raised center portion 27a fitting inside circular flange 26a. There is a slight gap between all parts of the clog guard and rotor to allow the rotor to be freely rotatable. Rotor 27 has a hole in it to receive shaft 23 with which it rotates and is made of a very light material, preferably high strength plastic, for a reason soon to be apparent. Cutter blade 19 is in abutting relation with rotor 27 on the bottom thereof and rotates with the rotor as can be seen in FIG. 3. The side of the rotor which faces the ground has a slight rectangular slot running through its center and of a sufficient width to receive cutter blade 19 which is riveted thereto by rivets 50. Cutter blade 19 is basically rectangular in shape and is made of steel the thickness and width of which are kept to a minimum. Blade mount 31 is fastened to cutter blade 19 with rivets 31a and the resultant assembly of cutter blade 19, rotor 27 and blade mount 31 is attached to shaft 23 with locking set screw 32. The outer diameter of rotor 27 is directly beneath the outside of flange 26a.

In the embodiment shown in FIG. 6 rotor 61 has a circular flange 61a which projects in an upwardly direction at the outer circumference of the rotor. Attached to deck 24 is stationary clog guard 60 preferably made of high strength plastic, the outside portion of which has a shoulder 60a which is adjacent flange 61a of rotor 61. Part 60b of clog guard 60 is adjacent rotor 61, also preferably made of high strength plastic. Motor studs 25 attach clog guard 60 to deck 24 and motor 11. Rivets 50 attach cutter blade 19 to rotor 61 and there is a slight gap between circular flange 61a of rotor 61 and shoulder 60a of clog guard 60 so that the rotor will be freely rotatable. A blade mount 31 is attached to cutter blade 19 by rivets 31a and the rotor cutter blade and blade mount are attached to shaft 23 by means of a set screw 32. Thus it can be seen that in the embodiment shown in FIG. 6 I have just reversed the geometry of the clog guard and rotor while keeping everything else the same as in the other embodiment of the invention.

In operation of both embodiments the operator merely actuates the switch, not shown, controlling communication between battery 14 and motor 11 allowing battery 14 to drive motor 11 to rotate shaft 23. This will in turn rotate rotor 27 and cutter blade 19 cutting the vegetation that the edger-trimmer passes over as the operator pushes the edger-trimmer along the ground as a trimmer or swings it from side to side as a sythe. Guard 17 will prevent large twigs and large objects from hitting cutter blade 19. The blade will be rotating at a very high speed allowing grass or other vegetation to be quickly and efficiently cut. The arrangement of the clog guard and rotor in both embodiments of the present invention prevents grass or other vegetation from reaching motor shaft 23 and wrapping around the shaft slowing or stopping its rotation. It is noted that in FIGS. 2 and 6 the gap between the clog guard and rotor is exaggerated for illustrative purposes and grass or other vegeation cannot pass through said gap to wrap around the motor shaft to stop rotation. By eliminating the problem of clogging and rotating the cutter blade at a high speed, a very small motor can effectively with sufficient power cut grass or other vegetation and since the motor power requirements will be small for the battery, the battery can be small and used for a reasonable length of time without need for recharging. Some grass or other vegetation will be in contact with the circumference of the rotor of both embodiments of the invention but because of the large diameter of the rotor it will not be able to effectively slow or stop the rotor shaft from rotating. If it is desired to use the edger-trimmer as a trimmer it is merely positioned as seen in FIG. 5.

A further feature of the present invention that deserves special attention is the construction of rotor 27. By having the rotor and cutter blade of light weight construction, the former preferably of high strength plastic, the rotor and cutter blade will have as little mass as possible and hence, rotate with as little kinetic energy as possible. This minimizes the starting torque of the motor prolonging battery life and insures that if a small stone or other object is hit by the rotating cutter blade the smallest possible amount of energy will be transferred to the stone or other object and thus it will not be projected great distances at high velocities. If the rotor and cutter blade were designed to be of a large mass, there would be a greater starting torque than in my design causing a large drain on the battery during starting and a large amount of kinetic energy associated with the rotating parts of the edger-trimmer thus providing for the transferring of a large amount of kinetic energy to any object that would be hit by the rotating blade with a resulting high velocity and great projectile travel distance imparted to the object. By my novel design I have minimized these problems.

Having thus described the invention, it is not intended that it be so limited as changes may be readily made therein without departing from the scope of the invention. Accordingly, it is intended that the subject matter described above and shown in the drawings be interpreted as illustrative and not in a limiting sense.

What is claimed is:

1. An edger trimmer power scythe for cutting growth comprising:
    (a) a deck having a first and second side,
    (b) a motor located on a first side of said deck and rigidly secured to said deck, said motor having a shaft that projects through said deck,
    (c) a clog guard secured to the second side of said deck and including means for surrounding said motor shaft for a substantial length of said motor shaft, said means for surrounding said motor shaft defining an annular volume about said shaft,
    (d) a cutter blade coupled to said shaft and located on the second side of said deck, and
    (e) a rotor rotatable with said cutter blade and having a portion projecting towards said deck and nesting within the annular volume defined by said guard to prevent growth from wrapping around the shaft as it rotates.

2. An edger trimmer according to claim 1 further comprising a handle, said motor being secured to said handle as well as said deck.

3. An edger trimmer according to claim 2 wherein said deck is L shaped with wheels attached to the shorter side of the L.

4. An edger trimmer according to claim 1 wherein said clog guard includes a flanged periphery, a portion of said rotor projecting towards said guard so as to be surrounded by said flanged periphery.

5. An edger trimmer according to claim 4 wherein said rotor includes an annular peripheral portion that surrounds the portion of said rotor that projects toward said clog guard, said annular peripheral portion of said rotor being adjacent said flanged periphery of said guard with the projecting portion of the rotor immediately adjacent on its periphery said clog guard.

6. An edger trimmer according to claim 1 wherein said clog guard is a hollow cylindrical member having a central axis, said member including a stepped portion at its periphery being a lesser dimension measured along the axis than any other portion of said member with a smaller radial distance from the axis, said rotor including a flanged peripheral portion that extends so as to be adjacent said peripheral stepped portion of said clog guard, said flanged peripheral portion of said rotor surrounding the portions of said clog guard of lesser dimension measured along the axis that have a smaller radial distance from the axis than said stepped portion.

7. An edger trimmer power scythe for cutting growth comprising:
    (a) a deck having a first and second side,
    (b) a motor located on a first side of said deck and rigidly secured to said deck, said motor including a shaft having an axis that projects through said deck,
    (c) a clog guard secured to the second side of said deck and including means for surrounding said motor shaft for a substantial length of said motor shaft, said means for surrounding said motor shaft defining an annular volume about the axis of said shaft,
    (d) a cutter blade coupled to said shaft and located on the second side of said deck, and
    (e) a rotor rotatable with said cutter blade and having a portion projecting towards said deck and nesting within the annular volume defined by said guard to prevent growth from wrapping around the shaft as it rotates.

References Cited

UNITED STATES PATENTS

| | | | |
|---|---|---|---|
| 2,630,665 | 3/1953 | Lauer | 56—25.4 |
| 2,767,541 | 11/1956 | Yacoby | 56—25.4 |
| 2,817,205 | 12/1957 | Muller | 56—25.4 |
| 2,826,889 | 3/1958 | Menge | 56—25.4 XR |
| 2,867,960 | 1/1959 | Stiles et al. | 56—25.4 |
| 2,909,885 | 10/1959 | Smith | 56—25.4 |
| 2,924,929 | 2/1960 | Albertson et al. | 56—25.4 |
| 2,968,903 | 1/1961 | Kesling | 56—25.4 |
| 3,087,295 | 4/1963 | Grupp | 56—25.4 |
| 3,176,455 | 4/1965 | Buchanan | 56—295 |
| 3,219,129 | 11/1965 | Yamada | 56—25.4 |

FOREIGN PATENTS 139,514  11/1950  Australia.

LOUIS G. MANCENE, Primary Examiner

J. A. OLIFF, Assistant Examiner